Oct. 28, 1941.  L. BUCHMANN  2,260,852

WINDSHIELD CLEANER MOTOR

Filed April 6, 1940

INVENTOR
Louis Buchmann,
BY
Beau, Brooks, Buckley & Beau.
ATTORNEYS

Patented Oct. 28, 1941

2,260,852

UNITED STATES PATENT OFFICE 2,260,852

WINDSHIELD CLEANER MOTOR

Louis Buchmann, Buffalo, N. Y., assignor to Trico Products Corporation, Buffalo, N. Y.

Application April 6, 1940, Serial No. 328,307

13 Claims. (Cl. 121—150)

The present invention relates to fluid pressure operated motors and has particular relation to such motors of the general type frequently employed for actuating windshield cleaners.

In such motors snap action valve means are usually provided for reversing the application of differential fluid pressures to the opposite faces of the piston means of such motors, for effecting reciprocation of the piston means. Since the direction of pressure application is reversed suddenly the direction of travel of piston means is also suddenly reversed, the action sometimes being so abrupt that whip is produced in the arm carrying the wiper blade when the motor is used in a windshield cleaner. The results are the imposition of excessive loads upon the wiper, or upon other apparatus actuated by the motor, and upon parts of the motor; excessive wear upon the wiper or apparatus and the motor parts; and the production of noises.

The present invention contemplates the provision of means to produce a dwell at the terminal phases of the operation of the piston means, whereby the reversal of motion of the latter, and of the parts driven thereby, is rendered less abrupt; the loads imposed upon the several parts is reduced; and the wear and noise attending operation of the motor are also decreased.

The invention further contemplates a motor wherein an atmospheric vent to the motor chamber on one side of the piston is provided, the vent being controlled by means responsive to the pressure obtaining on the opposite side of the motor chamber, thereby being controlled indirectly by the snap action valve means of the motor but operating in delayed relation with respect thereto.

These and other objects and advantages of the present invention will become apparent from the following description of the typical embodiment of the invention shown in the accompanying drawing, wherein.

Figure 1:
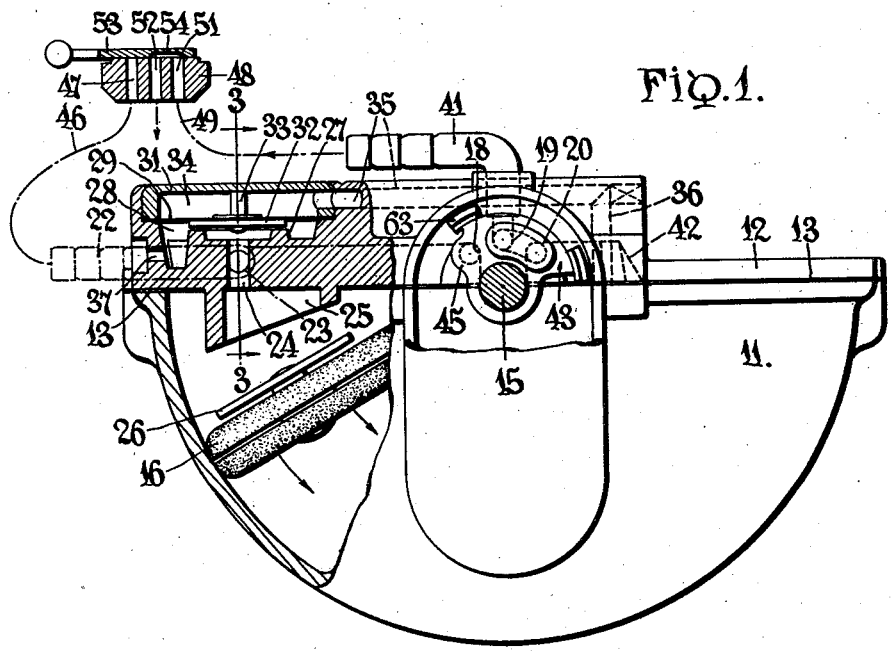
Fig. 1 is a front elevational view of the motor with certain parts broken away and appearing in section, and with control means for the motor indicated diagrammatically.
Figure 2:
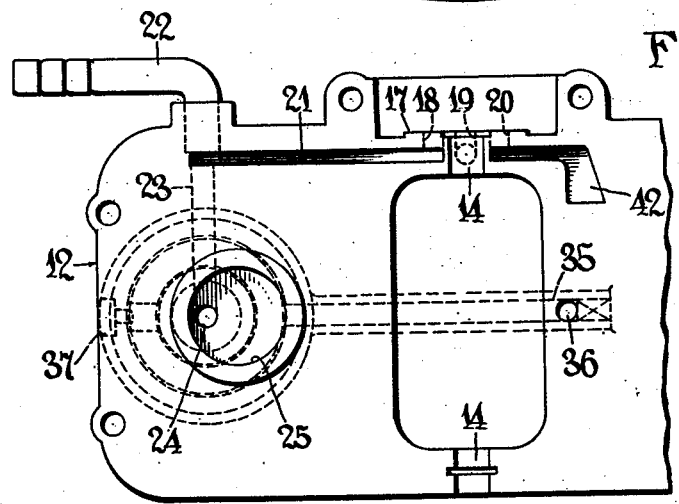
Fig. 2 is a bottom plan view of the cover section of the motor casing.

The motor casing may comprise a body section 11 and a cover section 12 sealed by a gasket 13, the casing having bearings 14 supporting a shaft 15 to which is secured a vane type of piston 16, the piston being adapted to oscillate in the motor chamber of the casing in an arcuate path about the axis of the shaft, angularly oscillating the latter.

On the cover section 12 of the casing is a valve seat 17 into which open valve ports 18, 19 and 20. Port 18 communicates through passage 21 with a nipple 22 and also, through a horizontal passage 23, with a vertical opening 24. The latter opens at its lower end into a well 25, in the motor chamber, which is adapted to be closed by a closure 26 on the piston when the latter is in parked position.

The upper end of opening 24 communicates, through an annular valve seat 27, with a chamber 28 whose upper wall is a flexible diaphragm 29. The latter is held in place by a member 31, which constitutes a part of the cover section 12, and carries a valve 32 adapted to seat upon annular valve seat 27 when the diaphragm is flexed downwardly. Upward movement of valve 32 is limited by its stem 33 abutting member 31.

The space between member 31 and diaphragm 29 constitutes a chamber 34 which opens, through a horizontal passage 35 and connected vertical passage 36, into the motor chamber at a point disposed to the opposite side of the piston from the opening 24. The chamber 28 is opened to the atmosphere through a vent 37.

Valve port 19 communicates with a nipple 41, and valve port 20 opens through passage 42 into the motor chamber on the same side of the piston as passage 36. Mounted for movement, upon shaft 15 and about the axis thereof, by snap action means, is a valve member 43 whose face is in sliding contact with valve seat 17. The snap action means may be of any suitable form such as that shown in Fig. 5, being operated by the shaft 15 to move the valve member 43 to the position shown in Fig. 1 when the piston approaches its operating limit position of clockwise movement and to move the valve to the position shown in Fig. 4 when the piston approaches its limit of counterclockwise movement (counterclockwise as viewed in Fig. 1).

The valve member has upon its face a channel 44 which, in the position shown in Fig. 1, opens communication between ports 19 and 20 while port 18 is closed by lip 45 of the valve member. In the position shown in Fig. 4 the valve member opens communication between ports 18 and 19 and opens port 20 to the atmosphere.

Nipples 22 and 41 may be connected by suitable conduit and valve means to one or more sources of operating pressure. In the drawing nipple 22 is illustrated, diagrammatically, as being joined by conduit 46 to port 47 in a valve body 48, and nipple 41 as being in communication through a conduit 49 with a port 51 in the body. A third port, 52, in the latter may be connected to a source of suction, or less than atmospheric pressure. A manually operated valve 53 having channel 54 therein may be moved to bring the channel into a position connecting ports 51 and 52, port 47 being closed, or to a position connecting ports 47 and 52, ports 51 being open.

When the valve 53 is in the first mentioned of these positions, the motor will operate as follows, starting with the position shown in Fig. 1 with the piston moving in the direction indicated by the arrows (counterclockwise):

Suction will draw air from the motor chamber on the right side of the piston through passage 42, port 20, valve channel 44, port 19, nipple 41, conduit 49, port 51, valve channel 54 and port 52 to the source of operating pressure. The diaphragm 29 will be lifted, to the limit of its upward movement since atmospheric pressure is exerted against its bottom surface while a partial vacuum prevails upon its upper surface by reason of withdrawal of air from chamber 34 via passages 35 and 36 and from the motor chamber on the right side of the piston outlined in the preceding sentence. Accordingly, air under atmospheric pressure will enter from vent 37 through chamber 28, past the now-open valve 32, and through passage 23 into the motor chamber on the left side of the piston.

The latter, by action of differential pressures upon the opposite faces thereof, will move to the right (counterclockwise) until its limit position is reached, at which time the valve member 43 will be reversed, the motor chamber on the left of the piston being connected to the source of suction via passages 24, 23 and 21, port 18, valve channel 44, port 19, nipple 41 and conduit 49, etc., while the motor chamber on the right side of the piston will be vented to the atmosphere via port 20 and passage 42, causing the piston to reverse and move in a clockwise direction.

There will be a delay or dwell in the reversing action at this terminal phase of movement since the suction will not become effective against the left face of the piston until the partial vacuum in chamber 34 has been dissipated by entry of air from the motor chamber on the right side of the piston, allowing valve 32 to be closed by the action of atmospheric pressure above and suction below, thereby closing off the atmospheric vent 37.

When the piston reaches its normal limit position of movement to the left, or clockwise, causing the valve 43 to assume again the position shown in Fig. 1, reversal of motion of the piston will again be delayed since air from the atmosphere cannot enter the motor chamber to the left of the piston until suction from the source has partially evacuated chamber 34, and also the motor chamber to the right of the piston, causing the diaphragm 29 to lift valve 32 from annular valve seat 27 and admitting air from the atmosphere into the left motor chamber.

It will thus be seen that the admission of atmospheric pressure at the beginning of one stroke, and at commencement of the other stroke the closing of the atmospheric vent to allow suction to become effective, are controlled by valve 32, which, of course, is in turn controlled by the snap action valve 43. And since chamber 34 and the right motor chamber are in fluid communication, action of valve 32 will always be delayed by the time required for evacuation of, or dissipation of vacuum from, both chambers.

When the valve 53 is moved to connect ports 47 and 52, thereby connecting nipple 22 to the source of suction, the piston will move to a parked position wherein member 26 closes well 25, this resulting from air being withdrawn from the left motor chamber via passages 24 and 23 to nipple 22 and the right motor chamber being vented to the atmosphere either by the then open port 51 or port 20, depending upon the position of valve member 43.

Figure 5:
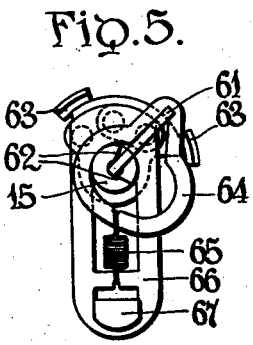
Figure 3:
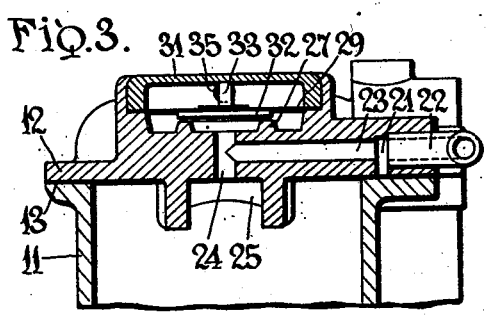
Fig. 3 is a fragmentary sectional view taken substantially along line 3—3 of Fig 1.

As stated hereinbefore, the snap action mechanism for operating valve 43 may be of the construction shown in Fig. 5, which is the subject matter of Patent No. 1,978,634 granted to Henry Hueber on October 30, 1934. This mechanism consists of a kicker 61 which is pivoted to the shaft 15 at the axis of the latter and is engageable by faces 62 of a recess in the end of the shaft. The kicker is engageable with ears 63 on valve 43 to shift the latter between its two operative positions, and its outer end is engaged by a frame 64 which is anchored by a spring 65 to a pressure plate 66 which is mounted over the shaft 15 upon a post 67 extended from the adjacent face of the casing 11, the pressure plate bearing against the outer face of valve member 43.

Figure 4:
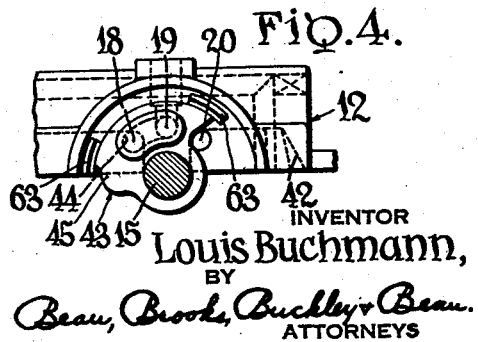
Fig. 4 is a fragmentary front elevational view showing the valve appearing in Fig 1 in reversed position; and, Fig. 5 is a front elevational view of a snap action mechanism for the valve shown in Figs 1 and 4.

It will be seen that when the shaft 15 turns angularly, counterclockwise as viewed in Fig. 5, right shoulder 62 will finally engage and move knicker 61 until the outer end thereof passes beyond a line extended through the center of post 67 and the center of shaft 15, whereupon spring 65 will snap the kicker counterclockwise against the left shoulder 63 of valve 43 and move the latter to its limit position, shown in Fig. 4. Movement of the shaft in the opposite direction, clockwise, will cause the parts to operate in the reverse manner, snapping the valve to the position shown in Fig. 1.

It will be understood that the structure herein shown and described is merly illustrative of the inventive principles involved and that these principles may be otherwise embodied without departing from the spirit of the invention or the scope of the appended claims.

I claim:

1. A motor having a chamber and reciprocating piston means therein, automatic valve means for alternately applying a higher pressure and a lower pressure to one side of the chamber, and for applying the lower pressure to the other side of the chamber when the higher pressure is applied to said one side, a valve for controlling admission of the higher pressure to the other side of the chamber, and means responsive to the pressure on said one side of the chamber to open said valve when said lower pressure prevails on said one side.

2. A motor having a chamber and reciprocating piston means therein, automatic valve means for alternately applying differential pressures to one side of the chamber and for alternately applying one of said pressures to the other side of the chamber, and other valve means for alternately applying the other of said pressures to said other side of the chamber, said other valve means being responsive to the pressure on said one side of the chamber.

3. A motor having a chamber and reciprocating piston means therein, automatic valve means for alternately applying atmospheric pressure and suction to one side of the chamber and for applying suction to the other side of the chamber when atmospheric pressure is applied to said one side, and other valve means responsive to the pressure in said one side of the chamber to admit atmospheric pressure to said other side when suction prevails in said one side.

4. A motor having a chamber and reciprocating piston means therein, automatic valve means for alternately applying a higher pressure and a lower pressure to one side of the chamber, and for applying the lower pressure to the other side of the chamber when the higher pressure is applied to said one side, a valve for controlling admission of the higher pressure to the other side of the chamber, and means responsive to the pressure on said one side of the chamber to open said valve when said lower pressure prevails on said one side, and a capacity chamber communicating with said one side of the chamber to delay operation of the pressure responsive means after operation of the automatic valve means.

5. A motor having a chamber and reciprocating piston means therein, automatic valve means for alternately applying differential pressures to one side of the chamber and for alternately applying one of said pressures to the other side of the chamber, and other valve means for alternately applying the other of said pressures to said other side of the chamber, said other valve means being responsive to the pressure on said one side of the chamber, and a capacity chamber in communication with said one side of the chamber to delay operation of said other valve means after operation of the automatic valve means.

6. A motor having a chamber and reciprocating piston means therein, automatic valve means for alternately applying atmospheric pressure and suction to one side of the chamber and for applying suction to the other side of the chamber when atmospheric pressure is applied to said one side, and other valve means responsive to the pressure in said one side of the chamber to admit atmospheric pressure to said other side when suction prevails in said one side, and a capacity chamber communicating with said one side of the chamber to delay operation of said other valve means after operation of the automatic valve means.

7. A motor having a chamber, reciprocating piston means and snap action valve means to alternate the application of fluid under higher and lower pressures to the chamber on opposite sides of the piston means for effecting such reciprocation, and means for momentarily restricting the effective fluid pressure differential on opposite sides of the piston means upon reversal of the valve means, for producing a dwell in the reversing action of the piston means, the restricting means comprising an atmospheric vent into the chamber on one side of the piston means, and pressure operated means responsive to the pressure prevailing on the other side of the piston means for opening and closing said vent.

8. A motor having a chamber and reciprocating piston means therein, valve means for alternately applying differential pressures to the chamber on the opposite sides of the piston means for effecting reciprocation of the latter, and means for delaying the application of such differential pressures at the initiation of each stroke of the piston means, to slow the reversing action of the piston means at the terminal phases of its operation, the delaying means comprising a valve for admitting air to one side of the chamber, and means responsive to the pressure on the other side of the chamber for controlling said valve.

9. A fluid motor having a chamber and piston means movable therein, valve means for alternately applying differential pressures to the sides of the chamber adjacent opposite faces of the piston means, said valve means including a valve for applying the lower pressure to one side and then applying the lower pressure to the other side of said chamber and applying the higher pressure to said one side, and said valve means including a second valve for admitting the higher pressure to said other side, and means controlled by the pressure in the chamber at said one side thereof for operating said second valve.

10. A fluid motor having a chamber and piston means movable therein, valve means for alternately applying differential pressures to the sides of the chamber adjacent opposite faces of the piston means, said valve means including a valve for applying the lower pressure to one side and then applying the lower pressure to the other side of said chamber and applying the higher pressure to said one side, and said valve means including a second valve for admitting the higher pressure to said other side, and means controlled by the pressure in the chamber at said one side thereof for operating said second valve, said last mentioned means comprising a flexible diaphragm for opening the valve when the lower of said pressures prevails in the said chamber at said one side thereof.

11. A fluid motor having a chamber and piston means movable therein, valve means for alternately applying differential pressures to the sides of the chamber adjacent opposite faces of the piston means, said valve means including a valve for applying the lower pressure to one side and then applying the lower pressure to the other side of said chamber and applying the higher pressure to said one side, and said valve means including a second valve for admitting the higher pressure to said other side, a second chamber in fluid communication with said one side of the motor chamber, and a flexible diaphragm constituting a wall of said second chamber for operating said valve.

12. A fluid motor having a chamber and piston means movable therein, valve means for alternately applying differential pressures to the sides of the chamber adjacent opposite faces of the piston means, said valve means including a valve for applying the lower pressure to one side and, alternately, applying the lower pressure to the other side of said chamber and simultaneously applying the higher pressure to said one side, and said valve means including a second valve for admitting the higher pressure to said other side, and means controlled by the pressure in the chamber at said one side thereof for operating said second valve, and means for applying the lower pressure directly to said other side of the motor chamber for parking.

13. A fluid motor having a chamber and piston means movable therein, valve means for alternately applying differential pressures to the sides of the chamber adjacent opposite faces of the piston means, said valve means including a valve for applying one of said pressures to one side and, alternately, applying the other of said pressures to the other side of said chamber and simultaneously applying said one of said pressures to said one side, and said valve means including means controlled by the pressure in the chamber at said one side thereof for applying said one of said pressures to said other side of the chamber.

LOUIS BUCHMANN.